United States Patent [19]

Cross, Jr.

[11] 4,421,237

[45] Dec. 20, 1983

[54] ELECTRO-MECHANICAL RETRIEVAL DEVICE FOR RANDOMLY FILED MATERIALS

[75] Inventor: Laurence A. Cross, Jr., Groveville, N.J.

[73] Assignee: Randomatic Data Systems, Inc., Trenton, N.J.

[21] Appl. No.: 291,593

[22] Filed: Aug. 10, 1981

[51] Int. Cl.³ .............................................. B07C 5/36
[52] U.S. Cl. .................................... 209/612; 209/610
[58] Field of Search ............... 209/608, 610, 612, 613, 209/547; 235/445

[56] References Cited

U.S. PATENT DOCUMENTS

| | | |
|---|---|---|
| 2,395,924 | 3/1946 | Wade . |
| 2,495,490 | 1/1950 | Whitson . |
| 2,665,694 | 1/1954 | Mooers et al. . |
| 3,266,497 | 8/1966 | Bleiman . |
| 3,486,617 | 12/1969 | Cross . |
| 3,618,763 | 11/1971 | Cross .................................. 209/608 |

Primary Examiner—Robert B. Reeves
Assistant Examiner—Donald Hajec
Attorney, Agent, or Firm—Frederick A. Zoda; John J. Kane

[57] ABSTRACT

A self-contained desk-top retrieval device for randomly filed cards or other records, accepts a capsule containing a quantity of the cards, and ejects from the capsule the specific card or cards desired. Each capsule has a series of card support bars differing from those of any other capsule, so that each capsule accepts only cards that are edge-coded to receive the bars. Within each capsule, the accepted cards are further edge-coded, whereby a coded input to a selector slide mechanism underlying the capsule, operates the slides to render accessible only those cards within the capsule that respond to the selected code. Through use of a keyboard incorporated in the equipment, or by operation of a remotely located keyboard of a computer terminal or the like, assurance is provided that no capsule will be accepted by the equipment that does not contain the card or cards desired, and it is further assured that within the proper capsule, no cards will be ejected that do not respond to the selected code.

17 Claims, 11 Drawing Figures

_Fig_8_

_Fig_10_

_Fig_11_

Fig. 9.

ELECTRO-MECHANICAL RETRIEVAL DEVICE FOR RANDOMLY FILED MATERIALS

BACKGROUND OF THE INVENTION

1. Field of the Invention

The invention pertains to the art of the selection and retrieval of randomly filed cards or other records. In a more particular sense, the invention has reference to equipment of this type in which the cards are filed in capsules that are insertable in the equipment in positions effective to expose, to a selector slide mechanism, the cards that are housed in the capsule so that the mechanism may be operated to produce only those cards that are desired, according to a code selected by the operator of the equipment.

2. Description of the Prior Art

Heretofore, the provision of edge-coded cards or other records has been well known, and in addition, the ejection of selected ones of the cards, from a quantity thereof that have been randomly filed, is a well known procedure, and has in many instances utilized the provision of a bank of selector slides actuable for the purpose of locating and producing only those cards that respond to a particular code impressed upon the equipment.

For example, my prior U.S. Pat. Nos. 3,231,186; 3,303,492; 3,486,617; 3,625,416; 3,618,763; and 3,827,553, all related to equipment in which selector slides act upon edge-coded records to produce one or more wanted cards. Also of significance is my U.S. Pat. No. 3,389,242 which is directed to an edge-code particularly designed for use in equipment coming within this general description.

The prior art devices as typically represented by the patents listed have many advantages in respect to the swift location and production of wanted, randomly filed cards. However, they also have some disadvantages which the present invention intends to obviate. For example, in some of the prior art devices, all the cards are contained in a single, large file tray, a situation which is undesirable in that it requires that the equipment be of excessive size and complexity, and that it serve as the main repository for the total volume of cards that are randomly filed in a particular office or storage facility.

In addition, in some of the earlier prior art devices, the equipment is of a somewhat complex nature, and this of course is undesirable in that there is an increased tendency toward trouble situations developing, as a result of which the equipment is taken out of service on frequent occasions.

Still further, in prior art devices wherein randomly filed records are to be located and produced, it is often necessary to provide pre-coded bars or strips attached to the edges of the cards, under conditions that alter the physical size of the card. As a result, the card's use in certain commercially available readers and printers is prohibited. This is not true of the cards usable in the equipment disclosed in my prior patents, but is known to exist in other, competitive pieces of equipment.

Still further, it is often desired to use equipment of this type for the purpose of locating and producing microfiche or film cards. In the prior art devices, each film card has typically been housed in its own unique jacket, and for purposes of retrieval the jacket itself has been coded. It follows that in such situations the film card itself must always be returned to its own, individual jacket in order to maintain the integrity of the system. This situation is obviously undesirable, in that it is subject to human failures or clerical errors.

In order to minimize the deficiencies noted in the prior art devices, it has been proposed in carrying out the present invention, to develop a retrieval device in which there is a minimum of movable elements, using micro-circuitry as a control means.

It has been further proposed to so design the device as to permit it to be controlled by its own integral keyboard or by an appropriately connected computer terminal.

It is further proposed to develop a device capable of accepting groups of cards that are edge-coded, and that are housed randomly within removable capsules or containers, thus to permit the capsules to be stored inexpensively and in a substantial number, separately from the equipment itself, thus to permit the equipment to be of compact, inexpensive construction.

It is proposed, too, to develop a capsule for the cards in which the several capsules can be quickly structured with coded card support bars along their bottom edges, to prevent refiling of records into the wrong capsule.

It is also proposed to develop a device that is capable of randomly accessing film cards such as microfiche, which would have no alterations other than a series of edge codes or notches along the cards themselves, with jackets or other specially designed coding arrangements being completely eliminated.

It is further intended to develop a device of the type stated that is capable of selecting film cards or microfiche that may have a removable wrap-around protective covering where necessary to protect the films, with the protective covering being interchangeable from one card to another and therefore not of necessity being unique to any individual card.

Finally, it is proposed to develop a highly flexible, stand-alone random access device that is capable of being manufactured at a very low cost in comparison to existing systems and equipment designed for a similar function, and that is further capable of operation in a trouble-free manner due to the relatively simple mechanisms employed therein.

SUMMARY OF THE INVENTION

Summarized briefly, the present invention is a combination of an electro-mechanical structure and microcircuitry so designed as to permit swift insertion or removal of a capsule containing a quantity of randomly filed cards. By operation of a simply designed keyboard, or by input fed from a remotely located computer terminal, the structure, within a matter of seconds, swiftly locates and produces a wanted card or cards. In accordance with the invention, the structure includes a capsule having an open bottom, designed to expose the edge-coded cards supported in the capsule, to a quantity of selector slides. The selector slides are operated to elevated positions according to a code impressed upon the micro-circuitry from a key-board or from a remotely located computer terminal. The selector slides are elevated by movement of a carriage containing selector-slide-actuating solenoids. When the selector slides have been actuated to impress the complete code of the wanted card or cards upon the capsule, the operation of an ejector plate drives the selected card or cards up and partially out of the capsule to permit their ready removal by an operator.

An automatic resetting of all of the component parts of the mechanism, ready for the next selection cycle, is effected at the conclusion of each selection cycle.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
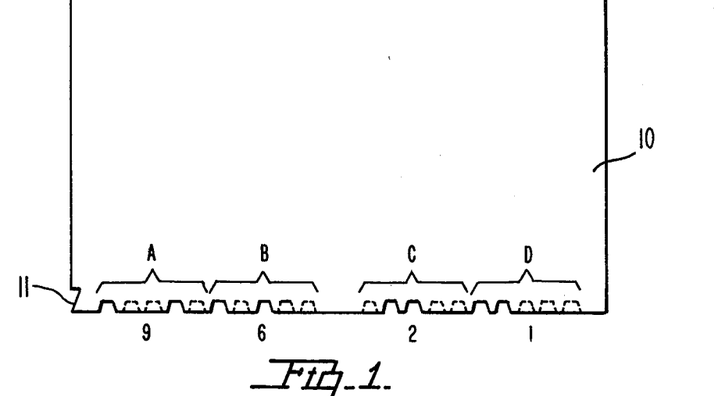
FIG. 1 is a front elevational view of a typical card used in the mechanism.

The present invention is designed to facilitate the location and production for the user, of cards such as illustrated by way of example in FIG. 1.

Figure 2:
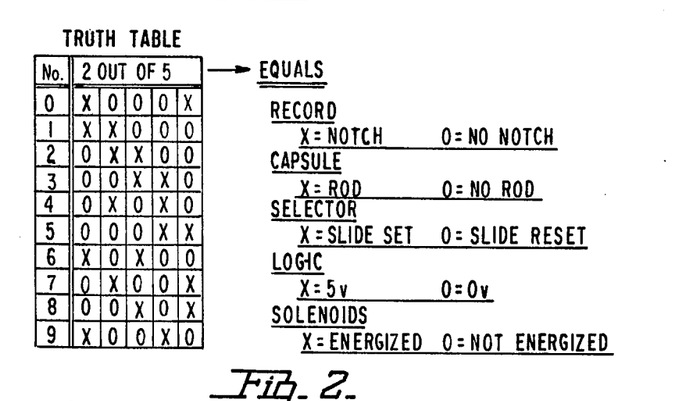
FIG. 2 is a view showing the truth table or code used in practicing the present invention.
Figure 3:
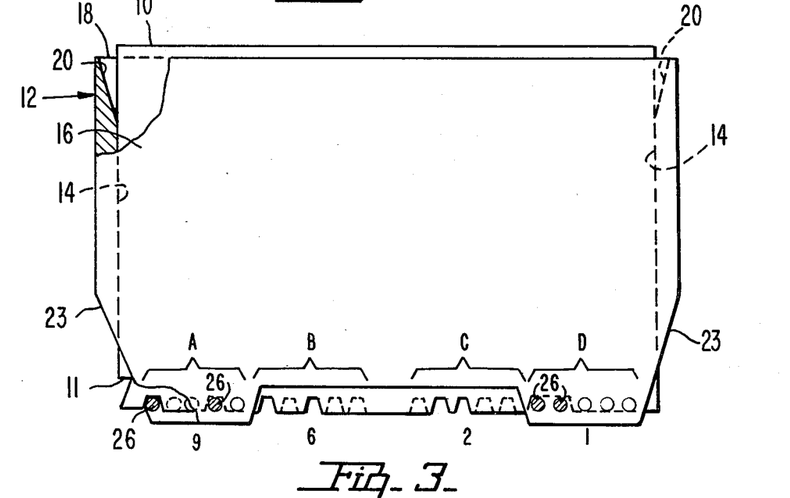
FIG. 3 is a front elevational view of one of the capsules, with the cards contained therein, a portion of the capsule being broken away.

A card of this type has been illustrated and described in my prior U.S. Pat. No. 3,389,242, the disclosure of which is incorporated herein by reference. For the purposes of the present invention, it may be sufficient to note that the bottom edge of each card is disclosed as being divided into four zones, A, B, C, and D. Each zone has five code-notched locations. The code used is a binary arrangement in which two notched positions are used out of the five available in each zone. Referring to FIG. 2, it is seen, for example, that the number "6" is coded for the first and third locations among the five available. By forming notches at the first and third locations, the number "6" is coded into zone B in the sample card illustrated in FIG. 3. In zone C, the second and third locations have been notched, and this denotes, as will be seen from the truth table or chart of FIG. 2, the number "2".

Obviously, there could be more zones to multiply the volume of cards that can be handled by a single piece of equipment. The arrangement shown is merely typical of any of various four digit numbers that could be represented from 0000 to 9999. In the illustrated example, as will presently appear, the zones A and D are used to code the cards to their capsule, that is, the bottom or card support portion of each capsule is coded in such fashion as to accept only a quantity of cards all of which are coded in zones A and D to match the code of the capsule. In zones B and C, all the cards of the capsule are individually coded to differ from one another. Thus, in each capsule, in the illustrated example, there are 100 cards, from 00 to 99. Further, in the illustrated system, there can be 100 capsules, coded from 00 to 99. In the disclosed arrangement, therefore, a total of 10,000 cards may be accommodated, all differing from one another as to their edge codes.

For a purpose to be made apparent, each card is formed with a lower corner notch 11. The capsule has been generally designated 12, and in the illustrated example comprises end plates 14 secured to a face plate 16 and a back plate 18. Each capsule is thus of an approximately rectangular configuration, having an open top through which the cards may be inserted and removed. Bevels 20 are provided on the inner surfaces of the end plates 14, at the upper ends thereof, to facilitate insertion and removal of the cards. Medial recesses 22 are formed in the face and back plates, exposing the B and C code notches of the cards. End indentations 23 in the capsules leave exposed the lower corners of the cards having notches 11.

Referring to FIGS. 3–6 and 10, registering openings 24 are formed in the face and backplates 16, 18 respectively. These openings are arranged in two series, with five openings in each series, one series being in zone A and one being in zone D.

Support bars 26 are insertable through and may be press-fitted or otherwise fixedly secured within selected registering openings of each series. Thus, two support bars 26 are extended through selected openings 24 in the series of capsule openings illustrated by way of example in FIG. 4. These support bars 26 are located in the first and fourth openings of the series, and hence represent the code number "9".

Figure 4:
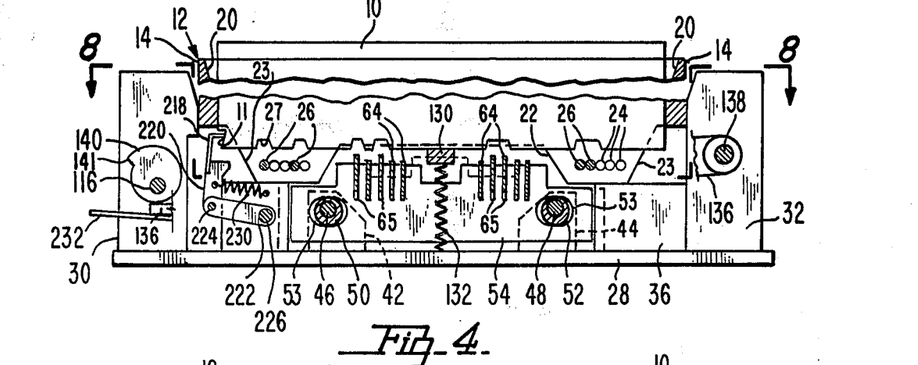
FIGS. 4, 5, and 6 are transverse sectional views showing the mechanism at successively following steps of the operation, taken substantially on line 4—4 of FIG. 8.

At the other end of the capsule, the support bars 26 are extended, in the illustrated example, through the first and second apertures of the series of openings 24. Accordingly, these support bars represent the numeral "1".

It follows that the particular capsule illustrated is capsule "91". It would therefore be shelf-stored in its proper place, among capsules "00" to "99".

The capsule construction illustrated and described permits every capsule to be coded separately from all the other capsules. Yet, the component parts of the capsule are the same in every instance, that is, the face plates, back plates, end plates, and support bars are all identically made. Yet, by fitting the support bars into the selected, coded apertures 24, the capsules are individually coded.

Since each card, in the illustrated example, has a four digit coded number, it will be understood that capsule "91" will accept only cards in which the first and fourth digits are "9" and "1" respectively. The two middle digits of the cards in capsule "91" will be coded "00" to "99", so that each capsule in the illustrated example accepts 100 cards.

The cards are edge-coded, having notches 27. The card has four zones with five code notch locations per zone.

Thus, all the cards acceptable by the capsule 12 illustrated by way of example must have notches 27 that will receive the card support bars 26 of capsule 12. Any card not coded "9" and "1" in the first and fourth zones respectively will not drop all the way into the capsule. Misfiling is thus prevented.

Figure 8:
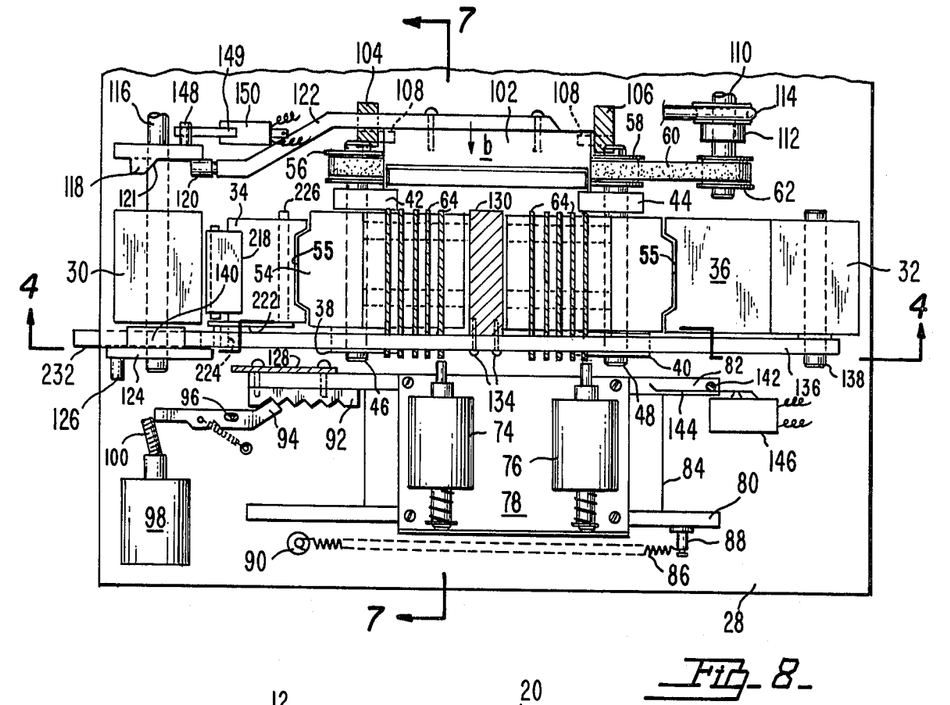
FIG. 8 is a horizontal section substantially on line 8—8 of FIG. 4.

The entire structure is mountable upon a flat base 28. Referring to FIGS. 4 and 8, affixed to base 28 are opposite but identical, transversely aligned, upstanding capsule locating blocks 30, 32. Side-by-side with the respective blocks 30, 32 are opposite but identical capsule support blocks 34, 36 affixed to base 28 and having flat upper surfaces offset downwardly from the upper extremities of blocks 30, 32 to cooperate therewith in locating and supporting (see FIG. 4) an inserted capsule 12 from which a randomly filed card 10 is to be selected.

Inwardly from the capsule support blocks (see FIG. 8) are transversely aligned front bearing blocks 38, 40 (see also FIG. 4), respectively aligned longitudinally of base 28 with rear bearing blocks 42, 44 which, like the front bearing blocks, are fixedly secured to and extend upwardly from base 28.

Parallel shafts 46, 48 are rotatably supported in bearing blocks 38, 42 and 40, 44 respectively. Receiving and made rotatable with shaft 46 in the space between blocks 38, 42 is a tubular cam or eccentric 50. A similar eccentric 52 rotates with shaft 48 in the area between bearing blocks 40, 44.

The respective eccentrics pass through parallel, through bores 53, of oblong cross-section (FIG. 4) formed in a selector slide support block 54 extending transversely of base 28 between the capsule support blocks 34, 36 and having a loose tongue-and-groove engagement 55 (see FIG. 8) with the blocks 34, 36. Block 54 is thus mounted for loose, up and down sliding motion between the capsule support blocks. Upon high-speed rotation of shafts 46, 48, this motion will be imparted to block 54 by the eccentric 50, 52, to vibrate block 54 to impart high-speed vibratory motion to the selector slide support block.

To drive shafts 46, 48, pulleys 56, 58 (FIG. 8) are made rotatable with the respective shafts adjacent bearing blocks 42, 44. A drive belt 60 is trained about both pulleys, and about a drive pulley 62 driven by an electric motor, not shown, that would be mounted upon the rear end portion of the base 28.

Figure 5:
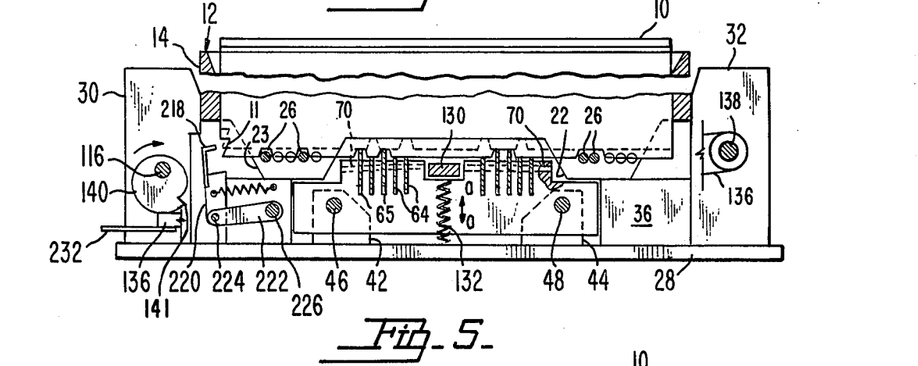

Upon rotation of the shafts 46, 48 the selector slide support block 54 is caused to have up and down vibratory motion as indicated by direction arrow a—a of FIG. 5.

Figure 7:
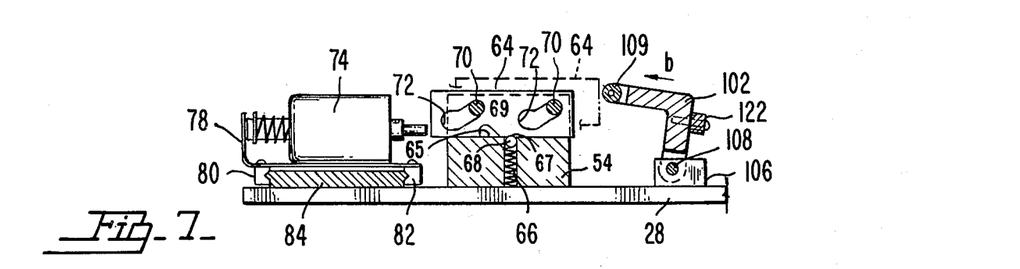
FIG. 7 is a sectional view taken substantially on line 7—7 of FIG. 8, the selector slides being shown in full and dotted lines in their rest and elevated positions, respectively.

Carried by the block 54 are two series of selector slides 64 mounted in slots 65 for movement between reset and set positions shown in FIG. 7 in full and dotted lines respectively.

Each slide is releasably engaged, in both slide positions, by a spring loaded ball detent 68 mounted in a vertical bore 66 of block 54. In the reset position of each slide, the ball detent engages in a shallow, downwardly opening recess 67 of the slide. When the slide moves forwardly and upwardly to the set, dotted line position shown in FIG. 7, the ball engages in a deeper recess 69 of the slide.

The movement of the slides from the reset to the set positions and back to the reset positions is controlled by transversely extending guide bars 70 mounted in the block 54. A pair of guide bars is provided for each slide series (see FIGS. 5 and 7), with the guide bars of each pair extending through angular, closed cam slots 72 formed in the several slides.

For the purpose of urging the slides from their rest or reset positions to their elevated set positions, there are provided transversely spaced selector slide set solenoids 74, 76 mounted upon a solenoid base plate 78 affixed to a pair of guide rails 80, 82 sliding upon a guide plate 84 affixed to base 28.

The base plate or carriage 78 is slidable to any of five positions, in the illustrated example, to align the cores of the solenoids with any of the five slides of the slide series associated with the respective solenoids. Thus, solenoid 74 is locatable in alignment with any of the first, second, third, fourth, or fifth slides of the left hand slide series shown in FIG. 8.

Normally urging the carriage to its left extreme position (viewing the same as in FIG. 8) is an extension spring 86 connected at one end to pin 88 projecting laterally from rail 80, and at its other end to upstanding stud 90 affixed to base 28.

To index the carriage to its five positions, a rack 92, having five notches defining the indexing stations is affixed to guide rail 82 (FIG. 8). An angular pawl 94 having a lost motion pivotal mounting on pin 96 extending upwardly from base 28, is spring biased into engagement with any selected notch of the rack.

The escapement pawl 94 will normally prevent the carriage 78 from traveling to the left in FIG. 8 under the pull of spring 86. However, affixed to base 28 is an escapement solenoid 98, having a laterally deflectable core 100 engageable with the end of the pawl 94 remote from the end thereof engaging rack 92. When energized and de-energized, solenoid 98 will allow the carriage 78 to increment one position to the left in FIG. 8. The mechanism is analogous to that used in a typewriter having a movable carriage. In sum, each of the solenoids 74, 76 can be indexed or incremented one step at a time through five positions through the rack-and-pawl means 92, 94, 96, 98, 100, and at each position to which they are indexed, either or both solenoids 74, 76 can be energized or not, to set or leave reset any combination of the left hand and right hand series of selector slides associated with the left and right solenoids 74, 76 respectively.

Assuming that the first and third slides of the left series have been moved to their set positions corresponding to the number "6", and that the second and third slides of the right hand series have also been moved to their set positions, they will remain in these positions until reset in the full line positions shown in FIG. 7. This is accomplished through the provision of a reset bail 102 (FIGS. 7 and 8) of inverted L-shape in cross-section extending between transversely aligned bail support blocks 104, 106 rigid with base 28 and having laterally inwardly extending pivot pins 108 engaging in opposite ends of the bail 102 to mount the bail for pivotal movement to a forward position in which a rubber covered roller 109 thereof engages those selector slides 64 that have been moved to set positions, and returns them to their reset, full-line positions shown in FIG. 7.

The shaft of the motor, not shown, used to drive pulley 62 has been designated 110 (FIG. 8), and rotatable with the shaft is a drive pulley 112 about which is trained a drive belt 114 extending transversely of base 28 adjacent and rearwardly of the bail 102.

Referring to FIG. 8, drive belt 114 extends to a gear reduction assembly, not shown, that would be mounted upon the base between the motor shaft 110 and a cam drive shaft 116. Shaft 116 is driven by the gear reduction assembly at a rate of 1 revolution for each single, complete card selection cycle.

For the purpose of biasing the bail 102 forwardly to reset all slides 64 that are in their set position, a rotary cam 118, rotatable with shaft 116, engages slide return roller 120 at the conclusion of a single card selection cycle. Roller 120 rides up on the inclined leading surface 121 of cam 118, moving the roller 120 forwardly, to carry with it slide return bar 122. Bar 122 extends transversely of the base, and is secured to the bail (FIGS. 7 and 8) so as to urge the bail forwardly in the direction of the arrow b. The bail is thus caused to engage those slides 64 that have been moved to set positions, and biases them back to their reset positions shown in full lines in FIG. 7.

Also secured to shaft 116 for rotation therewith (and hence making one revolution during each card selection cycle) is a cam disc 124, carrying a roller 126. During any selection cycle, carriage 78 with its solenoids 74, 76 will have been indexed to the left in FIG. 8 incrementally. At the conclusion of the setting of the several, appropriate slides representing the coded second and third digits of the wanted card, carriage 78 is returnable from the position to which it has been indexed toward the left in FIG. 8, to its standby, right hand position shown in FIG. 8, in which pawl 94 is in the notch of the rack 92 that is furthest to the left, and in which, further, the cores of solenoids 74, 76 are aligned with those slides 64 that are furthest to the right in the two slide series associated with the solenoids 74, 76 respectively.

The return of carriage 78 to its right hand position is accomplished by the roller 126, once during each card selection cycle after the desired selection slides 64 have been set. Roller 126 engages a cam plate 128 secured to rail 82, and biases it to the right in FIG. 8 against the force of extension spring 86, until the carriage reaches its right hand position shown in FIG. 8. Pawl 94 ratchets along the notches of rack 92, and engages the rack in the position shown in FIG. 8 to releasably engage the carriage assembly in its right hand position.

Figure 6:
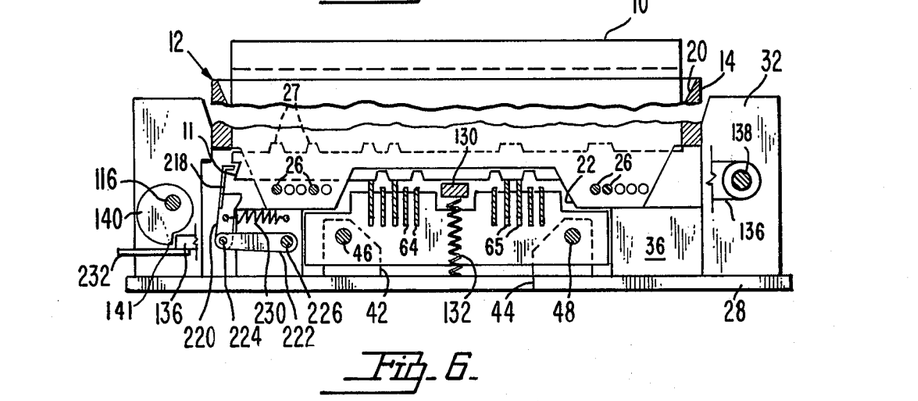

Medially between the two series of slides 64, and extending parallel to the slides, is a horizontally disposed card ejector plate 130, resiliently, yieldably biased upwardly by a compression coil spring 132 interposed between base 28 and the ejector plate (FIGS. 4-6).

Referring to FIG. 8, the front end of plate 130 is secured by screws 134 to an elongated, transversely extending ejector plate control arm 136, one end of which is pivotally attached to a control arm support pin 138 carried by capsule locating block 32, and the other end of which (FIGS. 4 and 8) underlies and slidably contacts the periphery of an ejector plate control cam 140 rotatable with shaft 116 through one complete revolution during each card selection cycle.

Once the correct array of slides 64 has been set, the carriage 78 would have moved to the extreme left. At this time, a lug 142 on rail 82, (see FIG. 8) will engage the distal end of a switch arm 144 on switch 146, to start the motor, not shown, that drives shafts 110 and 116. This initiates rotation of cams 118, 140, and 124, and at the same time causes vibratory up and down motion of the selector slide support block 54.

Referring to FIG. 8, a roller 148 on cam 118 at the conclusion of the card selection cycle, engages arm 149 of a switch 150 in circuit with the motor to turn the motor off at the completion of the card selection cycle.

As previously discussed herein, only two numbers are required to locate a specific record within any capsule. The two numbers can be entered via a ten-button keyboard, or by a computer when properly interfaced. The two numbers are then stored and held in memory within the selector after which they can, upon command, via an operate key, be fed out serially to the solenoids 74, 76 operative together with the escapement solenoid 98 to set or leave unset, as the case may be, the correct array of slides 64 representing the two numbers in the established two out of five mode.

Figure 9:
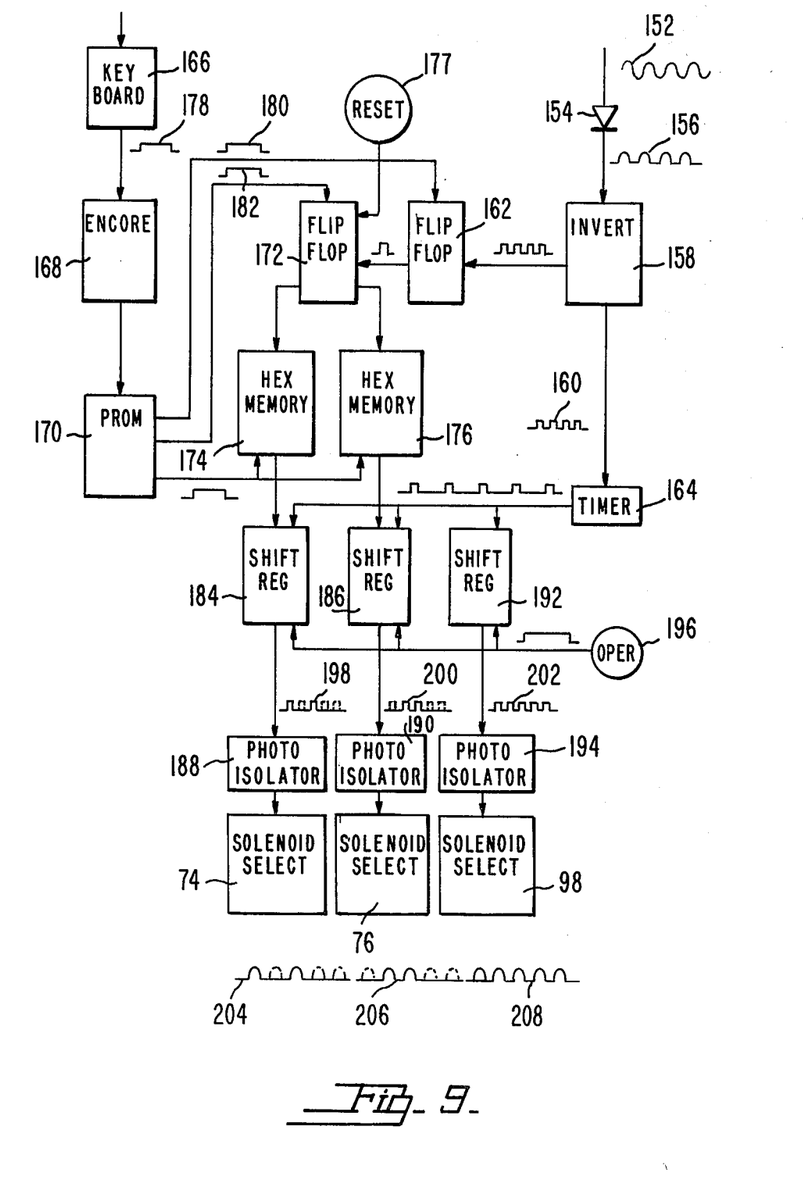
FIG. 9 is a schematic or diagrammatic representation of the electrical circuitry used.

All logic within the device is accomplished with integrated circuits operating from a 5 V DC power supply. The solenoids, when energized, operate from a half-cycle pulse of 110 V AC/60 H. For this reason, all circuits requiring timing are synchronized to the AC sine wave via 6 V AC/60 H power obtained from a power supply transformer. Referring to FIG. 9, the logic for selection is as follows: the 6 V AC/60 H represented by waveform 152 is fed into diode 154 to provide half-cycles as shown at 156. This waveform is sent through an inverter 158. The output from the inverter is a square wave half-cycle 160 for timing purposes to flip-flop 162 and timer 164.

The keyboard 166 of the equipment is powered by 5 V DC and is connected to encoder 168 which accepts a single line input and converts it to a standard BCD (binary coded decimal representation), and further effects an output of this code to PROM (programmable read-out memory) 170. PROM 170 converts the BCD code to a two out of five code and outputs it as such.

PROM 170 uses seven of its available outputs as follows: five are for the two out of five code and two are used to control flip-flops 172, 162. The two out of five outputs are technically bit locations, which are further defined as follows: a bit location can contain a bit (or 5 V) or no bit (0 V). This again relates to the truth table illustrated in FIG. 2. All bit locations that are output from PROM 170 are sent to both HEX memories 174, 176 simultaneously. When properly triggered, either HEX memory will accept and store all bit locations in their correct state that do not constitute output from PROM 170.

This is accomplished as follows: in FIG. 9 there are shown two additional outputs from PROM 170, one to the flip-flop 172 and the other to the flip-flop 162. Both flip-flops are two-state or yes-no devices. If flip-flop 172 is set for "yes" to HEX memory 174, the proper bit locations from the PROM 170 will be stored. When so conditioned, flip-flop 172 is set for "no" to HEX memory 176. Accordingly, no storage takes place in HEX memory 176.

Under these conditions, flip-flop 172 is set for "no" to HEX memory 176. Accordingly, no storage takes place in memory 176.

Concurrently with the above, the remaining output from PROM 170 goes to flip-flop 162. This is wired to output one and only one single pulse to flip-flop 172 according to the particular keyboard entry.

This pulse will terminate the entry and transfer control of flip-flop 172 from HEX memory 174 to memory 176. The second number entered from the keyboard will now be stored in HEX memory 176 and not in memory 174, in a similar manner to that described above.

Once this has occurred, flip-flop 174 again transfers via flip-flop 162 and becomes inactive to both HEX memories 174, 176, negating all further keyboard entries. To enter new keyboard inputs, the reset key 177 must be activated, and this will transfer flip-flop 172 back to its original state. Bit locations coming from PROM 170 will now be rewritten over any previous information that may have been stored in HEX memories 174, 176. The actual pulse time into the encoder 168 and out of the PROM 170, as illustrated by waveform at 178, 180, 182, will be consistent with any length of time that a key is held down.

Assuming the information stored to be correct, control to the solenoids is as follows: HEX memories 174, 176 are wired to shift registers 184, 186 respectively. The shift registers will accept, upon command, bit locations from HEX memories 174 and 176 in a parallel form, and will output the same serially to their respective photo isolators 188, 190.

A shift register 192 has bit locations pre-wired for output to isolator 194. Each isolator is in effect an SCR, which is controlled by a 5 V DC photo cell and as such couples the 5 V DC logic to the 110 V AC half-cycles required by the several solenoids.

All the shift registers are simultaneously activated by the "operate" key 196. The speed at which the bit locations are serially output is controlled by timer 164. Timer 164 is synchronized to 60 H, but the pulses output to the shift registers are spaced at intervals that will allow the solenoids to function properly mechanically. Typically, shift register outputs are shown by waveforms 198, 200, and 202 respectively. Waveforms 204, 206, and 208 to the solenoids will always agree with those of the shift registers. Once the five bit locations of the three shift registers have been read out, no further logic activity takes place, as the selector would go through a machine cycle at this time.

As indicated by waveform 202, shift register 192 is preset to operate the escapement solenoid 98 through its required locations.

Solenoids 74, 76 are of the push type and operate mechanically when energized. Solenoid 98 is a pull type and mechanically operates when de-energized. As such, all three may be energized simultaneously without mechanical interference.

Figures 10, 11:
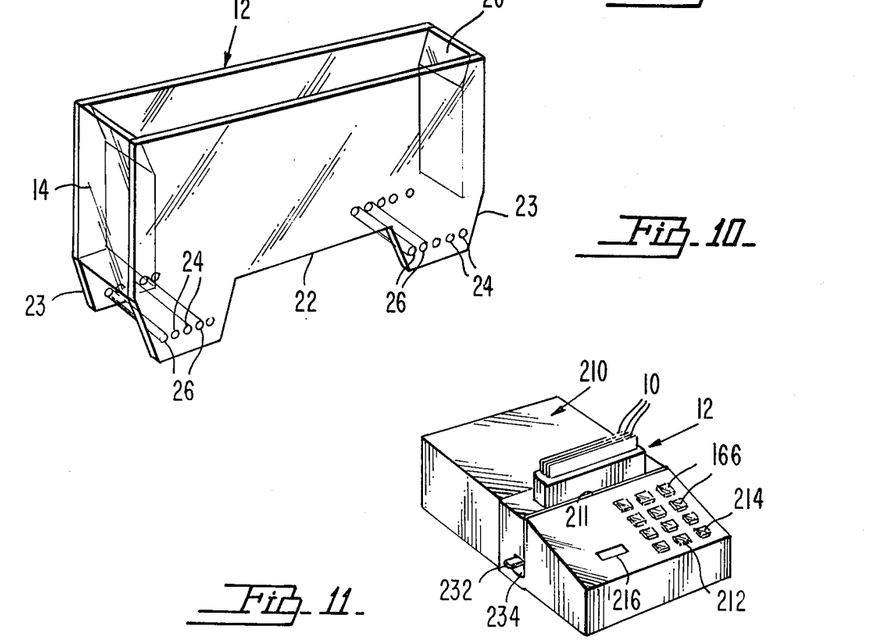
FIG. 10 is a perspective view of one of the cartridges per se, on an enlarged scale.
FIG. 11 is a perspective view of the equipment comprising the present invention.

Referring to FIG. 11, the device as shown in its completely assembled condition, including a housing 210 having a transversely extending slot 211 through which the capsule 12 is insertable and removable along with its cards 10. The keyboard is shown at 166 as a ten digit keyboard having, in addition, operate and reset keys 212, 214. Adjacent the keyboard is a digital read-out window 216 in which will be displayed the two digit coded number impressed upon the mechanism by operation of selected keys of the keyboard, representing the second and third digits of the wanted cards.

It is quite possible that there may be only a few cards, say fifteen or twenty, in a particular capsule. If so, a selected card is likely to resettle into the capsule at the end of the selection cycle, thus negating the selection. To prevent this, a retainer bail 218 formed as an inverted L-shaped plate has a distal end engageable in the notches 11 of all the cards. The plate is secured at its proximal end to a retainer bail cam block 220 pivotally attached to an arm 222 by a pin 224. The other end of arm 222 is attached to block 34 by a pin 226 freely rotatable in block 34. Pin 224 passes through a slot 228 (FIG. 8) in arm 136. Bail 218 thus follows the up-and-down motion of arm 136. Block 220 is continuously urged toward bearing block 34 by an extension spring 230.

OPERATION

As previously noted herein, the capsule and card illustrated are purely exemplary. They are usable in a typical system in which there are 100 capsules and 100 records per capsule.

Let it be assumed that at a particular storage location, there are 26 of these capsule systems, representing a total of 260,000 cards. Each system may, for example, be prefaced with a letter so that there are stored capsule systems going from A to Z. Obviously the number could be multiplied to any extent desired by providing two letter prefix numbers (for example, "AB", "AC", etc.).

In any event, let it be assumed that one desires card K-9621. The user locates the K group of 100 capsules, and extracts capsule K-91. This is inserted in the equipment. One now operates the keyboard to impress the number "62" on the mechanism, since this will be the card responding to the full numerical designation "K-9621".

Obviously, instead of using a keyboard 166, the equipment could be connected to a computer terminal, not shown. In such an event, any card number could be translatable by the computer into the number selected herein by way of example as "9621".

When the capsule is inserted, the ejector plate 130 and bail 218 will be at a position shown in FIG. 4, and as a result, as the capsule moves to its fully inserted position, the cards will all be elevated to the position shown in this figure of the drawing. By entering the number "62" on the keyboard, solenoid 98 operates to index the carriage 78 from its extreme right hand position shown in FIG. 8, in one step increments until it has been moved fully through five increments, to its extreme left hand position in which the cores of the solenoid 74, 76 will be disposed in alignment with the slides 64 that are farthest to the left in their respective slide series.

Solenoids 74, 76, during the step-by-step movement of the carriage, are operating through the electrical logic shown in FIG. 9, to set the appropriate slides representing the numeral "62". These slides are set to the position shown in FIG. 4 with the carriage 78 now having been moved to its extreme left position.

Movement of the carriage to this position causes switch 146 to be energized to start the motor. As a result, motor shaft 110, upon rotating at its regular speed, causes high speed rotation of shafts 46, 48 to produce vibratory motion of the selector slide support block 54 and all the slides carried thereby. Also, shaft 116 begins to turn at the desired rate of one revolution per complete card selection cycle.

The slow rotation of shaft 116 causes cam 140 to be rotated from the FIG. 4 to the FIG. 5 position thereof. This biases the ejector plate control arm 136 downwardly, lowering the ejector plate to the FIG. 5 position. Since pin 224 is carried downwardly by the arm 136, block 220, moving downwardly therewith, is biased outwardly by block 34 and shifts the bail 218 clear of notches 11.

As a result, all unwanted cards 10 within the capsule come in contact with the upper edges of the elevated, "set" slides 64. Since these unwanted cards do not have code notches matching those of the set slides, they remain above the wanted card, which is permitted to drop by vibration below all the unwanted cards, due to the fact that its notches do match those of the set slides. In FIG. 5, the wanted card is shown in full lines, while the bottom edge of a typical unwanted card is shown in chain-dotted outline.

Referring now to FIG. 6, the further rotation of cam 140 causes its high point 141 to pass the distal end of arm 136. As a result, arm 136 drops off the step in the cam.

The loading of spring 132 is such as to permit the spring to be now permitted to suddenly expand to the extent of the depth of the step 141 in the cam 140.

Ejector plate accordingly is snapped upwardly from the FIG. 5 to the FIG. 6 position. The FIG. 6 position is below the bottom edges of all the unwanted cards, these being represented in full lines in FIG. 6. Therefore, the sudden upward snap motion of ejector plate 130 is not exerted against any unwanted cards. It is, however, exerted against the wanted card, because that card, shown in full lines in FIG. 5, had dropped below the remaining, unwanted cards.

The snap motion of the ejector plate, thus exerted against the bottom edge of the wanted card, causes it to be snapped upwardly well above the unwanted cards, to the position shown in FIG. 6, in which the bottom edge of the wanted card is shown in dotted lines.

When arm 136 drops off the step of cam 140 and moves upwardly, the cam block moves back to its original position shown in FIGS. 4 and 6. Bail 218 now enters notches 11 of all the unwanted cards. The selected card, should it start to resettle, cannot do so because its corner will encounter the top surface of the bail.

The top edge portion of the wanted card is now well above the upper edges of the remaining cards. The user may thus remove the wanted card for the purpose which necessitated its selection.

As shaft 116 continues to rotate, ultimately cam projection 126 will engage the carriage return plate 128, biasing the carriage back to its standby condition shown in FIG. 8.

Further, cam 118 will engage roller 120, to cause the reset bail 102 to be operated in a forward direction, to reset all slides 64 that have been elevated to set positions. And, at the end of the cycle, cam projection 148 will engage arm 149 to operate switch 150 for the purpose of turning off the motor, leaving the device ready for its next card selection cycle.

When the capsule is removed at the end of a selection cycle, the bail 218 will be cammed out of its FIG. 4 position temporarily by the inclined surfaces of notches 11 of the cards remaining in the capsule. It will immediately return to its FIG. 4 position after it clears the cards.

When a new capsule is being inserted, the bail 218 would be in the path of the entering cards. Accordingly, one depresses a finger tab 232 that projects from the distal end of arm 136 through a slot 234 formed in the side wall of the housing 210 (see FIG. 11), and holds the arm 136 down while the capsule is being inserted, thus causing the bail 218 to be temporarily located in the FIG. 5 position thereof until the new capsule is fully inserted. It then reverts to the FIG. 4 position when the tab is released.

Other means, such as a bail deflector engaged by the entering capsule can be employed to eliminate the manual operation of tab 232.

While capsule 12 is itself regarded as novel in respect to the concept of coding it to prevent misfiling (through use of the code bars 26), other means for preventing misfiling may be employed. For example, the cards may have code notches in their upper edges. In this event all cards to be filed in a particular capsule may have like, registering upper edge code notches. One may therefore determine visually whether a card has been misfiled. This arrangement would permit all the capsules to be identical.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A device for retrieving randomly filed cards or the like, comprising:
    (a) a support structure;
    (b) a capsule removably insertable therein and adapted to receive a quantity of randomly filed cards having code notches in one edge thereof;
    (c) a selector slide support block movably mounted in said structure and underlying the capsule;
    (d) a plurality of selector slides mounted on said block for movement between retracted, reset positions and advanced, set positions;
    (e) means for advancing selected ones of the slides, matching the code notches of a wanted card, to their set positions;
    (f) means for vibrating the block;
    (g) means for ejecting a selected card; and
    (h) means for returning to their reset postions those slides which have been advanced to set positions.

2. A device as in claim 1 wherein the support block is mounted upon the support structure for up-and-down motion.

3. A device as in claim 2 in which the means for vibrating the block includes a plurality of shafts rotatably mounted upon the support structure, the block having bores through which the shafts are extended, and cams rotatable with the shafts within said bores and adapted to impart a vibratory up-and-down motion to the block.

4. A device as in claim 3 wherein said bores are of an oblong cross-section, the cams being in the form of elongated sleeves secured to the shafts for rotation therewith in engagement with the walls of the bores, said shafts being connected for conjoint rotation whereby said cams will rotate in unison to impart the desired vibratory motion to the block, said block and support structure being inter-engaged to guide the block in its up-and-down motion.

5. A device as in claim 1 further including means carried by said block adapted to releasably engage the slides in their reset and set positions.

6. A device as in claim 5 wherein said means includes a plurality of spring-loaded detents, one for each slide, mounted in the blook, each slide having spaced recesses one of which engages the associated detent in the reset position of the slide, and the other of which engages the detent in the set position of the slide.

7. A device as in claim 1 wherein the mounting of the slides in the selector slide support block comprises pins carried by the block and extending transversely through the several slides, the slides having angular guide slots through which said pins extend, said block having slots within which the slides are supported for movement between their reset and set positions, the angular slots of the slides being formed to impart movement to a slide both upwardly and in the direction of its length from its reset to its set positions.

8. A device as in claim 1 wherein said means for returning the slides to their reset positions comprises a member extending transversely of the several slides and mounted for actuation longitudinally of the slides in a path effective to engage the advanced slides and return the same to their reset positions.

9. A device as in claim 8 wherein said means for returning the slides to their reset positions comprises a bail pivoted upon the support structure for movement between a rest position and an advanced position in which the bail engages the slides and biases the same to their reset positions.

10. A device as in claim 9, further including means for advancing said bail from its rest position once during each card selection cycle, following ejection of the selected card.

11. A device as in claim 1 wherein said means for ejecting a selected card comprises an ejector plate adapted to extend under all the cards in underlying relation to the capsule, and means for imparting a snap motion to said plate through a path effective to engage only the wanted card, for driving the wanted card to an offset position relative to the remaining cards in the capsule.

12. A device as in claim 11, said means for ejecting the wanted card further including a spring associated with the ejector plate, the ejecting means further including means for initially depressing the ejector plate to load the spring and thereafter release the ejector plate to permit expansion of the spring, thereby to impart the snap motion to the ejector plate.

13. A device as in claim 12 wherein the means for initially depressing the ejector plate includes an elongated arm secured to the ejector plate and pivotally mounted upon the support structure, and cam means adapted to initially impart pivotal movement to the arm in a direction to depress the ejector plate, said cam means including a drop-off step for releasing the arm whereby, under pressure of the spring, said ejector plate will be given its snap motion to eject the wanted card.

14. A device for retrieving randomly filed cards or the like, comprising:
(a) a support structure;
(b) a capsule removably insertable therein and adapted to receive a quantity of randomly filed cards having code notches in one edge thereof arranged in a plurality of zones, the capsule including card-engaging means coded to match the notches of at least one of the zones;
(c) a plurality of selector slides underlying the capsule and selectively movable to positions in which the selected slides extend within the code notches of at least a second zone of a wanted card;
(d) means for off-setting the wanted card relative to the remaining cards;
(e) ejector means movable through a path in which it engages only the wanted card and drives the same to an access position; and
(f) blocking means movable within a path, upon driving of the wanted card to its access position, effective to prevent return movement of the wanted card from its access position to the positions occupied by the remaining, unwanted cards.

15. A device for retrieving randomly filed cards or the like, comprising:
(a) a support structure;
(b) a capsule removably insertable therein and adapted to receive a quantity of randomly filed cards having code notches in one edge thereof;
(c) a plurality of selector slides underlying the capsule and selectively movable to positions in which the selector slides extend within the code notches of a wanted card;
(d) means for off-setting the wanted cards relative to the remaining cards; and
(e) ejector means movable through a path in which it engages only the wanted card and drives the same to an access position, said capsule having means for coding the same to match code notches of cards supported therein.

16. A device as in claim 15 in which the area in which the capsules are coded are off-set from the areas in which the selector slides are disposed, whereby to permit some code notches of the cards contained in the capsule to be used for matching the capsule code, while leaving other code notches of the supported cards available to receive the selector slides as means for locating a wanted card within each capsule.

17. A device as in claim 16 in which the capsules are open at their bottoms to permit extension of the selector slides to set positions in which they will engage in code notches of a wanted card.

* * * * *

UNITED STATES PATENT AND TRADEMARK OFFICE
CERTIFICATE OF CORRECTION

PATENT NO. : 4,421,237
DATED : December 20, 1983
INVENTOR(S) : Laurence A. Cross, Jr.

It is certified that error appears in the above-identified patent and that said Letters Patent is hereby corrected as shown below:

Column 12, line 53, change "blook" to -- block --.

Signed and Sealed this

Twenty-fifth Day of December 1984

[SEAL]

Attest:

GERALD J. MOSSINGHOFF

*Attesting Officer*       *Commissioner of Patents and Trademarks*